United States Patent [19]
Geier

[11] 3,905,182
[45] Sept. 16, 1975

[54] ROTARY MOWER

[76] Inventor: Horst W. Geier, 18 Hawley Ter., Yonkers, N.Y. 10701

[22] Filed: Feb. 13, 1974

[21] Appl. No.: 442,230

[52] U.S. Cl. .................................. 56/13.6; 56/295
[51] Int. Cl. ............................................ A01d 55/18
[58] Field of Search .......... 56/295, 12.9, 13.5, 13.9, 56/192

[56] References Cited
UNITED STATES PATENTS

| | | | |
|---|---|---|---|
| 3,395,522 | 8/1968 | Zweegers | 56/295 |
| 3,469,378 | 9/1969 | Heesters et al. | 56/295 X |
| 3,507,104 | 4/1970 | Kline et al. | 56/295 |
| 3,581,482 | 6/1971 | Reber | 56/295 |

FOREIGN PATENTS OR APPLICATIONS

| | | | |
|---|---|---|---|
| 1,519,808 | 2/1968 | France | 56/295 |

*Primary Examiner*—Louis G. Mancene
*Assistant Examiner*—J. N. Eskovitz
*Attorney, Agent, or Firm*—Richard A. Joel

[57] ABSTRACT

A rotary mower comprises a cutting cylinder with a collar section, having a plurality of blades mounted thereabout at spaced intervals. The blades are rotatable about their mounting to prevent damage when the blade strikes loose stones and the like. The blade may be mounted within a channel style roof or a predetermined collar section or collar ring which permit a complete or partial rotation of the blade. The mower also includes suitable ducts and at least one radially arranged vane on the underside of each cutting cylinder with one saucer underneath each cutting cylinder and at least one predetermined lamination inside each saucer to provide a vertical updraft whereby the material being cut by the mower is elevated upwards for cutting purposes.

19 Claims, 15 Drawing Figures

ROTARY MOWER

BACKGROUND OF THE INVENTION

The present invention relates to mowers and particularly to rotary mowers including means for protecting the cutting knives or blades and means for more efficiently and effectively cutting grass and the like by providing an updraft which draws the grass into the path of the blades.

One of the common types of mowers for cutting grass and agricultural crops is the drum-type rotary mower wherein a plurality of blades are carried in an orbit around a substantially vertical central axis. A serious problem with such mowers is the possibility of damage to the blades which occurs when the blades strike stones, fence posts or other solid objects. One solution to this problem is disclosed in U.S. Pat. Nos. 3,656,286 and 3,662,529 to Glunk, et al., wherein it has been found advantageous to permit swinging movement of the blade upon striking a rock or other hard substances. The swinging movement minimizes breakage of the blade, shearing of the blade mounting pins and overloading of the drive and transmission mechanisms.

U.S. Pat. No. 3,507,104 to Kline, et. al., also discloses a drum-type cutter having a plurality of swivelably mounted blades which are mounted in an angular position and which may be removed for replacement while U.S. Pat. No. 3,621,642 to Leake shows a cutter disk having a plurality of blades which are moveable upon engagement with a stationary object. The present novel arrangement also differs from the prior art wherein knives and knife holders are positioned inside the annular ring gap between a rotating and stationary saucer and a rotating collar section.

Another problem encountered by rotary mowers occurs when the grass under the influence of the horizontal air flow generated by the counter rotating cutting cylinders tends to duck away from the cutting blades and to erect itself behind the mowers, thus leaving an undesirable uncut strip in the center area between each pair of the correlated cylinders. This problem is particularly acute in thin hay, for example, second and third cuttings in alfalfa growing regions and in prairie grasses. Zweegers U.S. Pat. No. 3,391,522 discloses a typical prior art machine where the aforementioned problem tends to occur.

SUMMARY OF THE INVENTION

As distinguished from the prior art, discussed above, the present invention relates to a new and improved rotary type mower which provides greater protection for the cutting cylinders, cutting knives and knife fasteners and simultaneously generates an intensive updraft to avoid uncut hay strips between correlated counter rotating cutting cylinders in thin hay crops.

A drum-type rotary mower comprises a cutting cylinder with a collar section, which is either substantially level, continuous downwardly sloped over its entire depth, or substantially level toward the center and downwardly sloped about its perimeter, having a plurality of blades mounted thereabout at spaced intervals. The blades may be mounted within a channel style roof or a predetermined collar section or collar ring which permit a complete or partial rotation of the blade when it strikes stones and the like. The blower also includes suitable ducts and at least one radially arranged vane and a saucer on the underside of the cutting cylinder with predetermined laminations on the inside of the saucer to provide a vertical updraft whereby the material being cut by the mower is elevated upright for cutting purposes. While the particular features above are discussed with reference to a drum type mower, they are also suitable for use in disc type rotary mowers as well.

Accordingly, it is an object of this invention to provide a new and improved rotary type mower.

It is another object of this invention to provide a new and improved rotary mower including unique means for protecting and changing the knives and knife fastener elements on said mower.

A further object of this invention is to provide a new and improved mower, including means to provide a stong updraft whereby the material being cut is forced into the path of the blade.

A more specific object of this invention is to provide a new and improved mower featuring a number of rotatable blades mounted to a rotating body, a blade fastening system which is better protected against collisions with solid objects and a blower type arrangement devised to erect the grass in the path of the mower for cutting purposes.

BRIEF DESCRIPTION OF THE DRAWINGS

Other objects and advantages of the present application may be more clearly seen when viewed in conjunction with the accompanying drawings wherein.

DETAILED DESCRIPTION OF THE DRAWINGS

Figure 1:
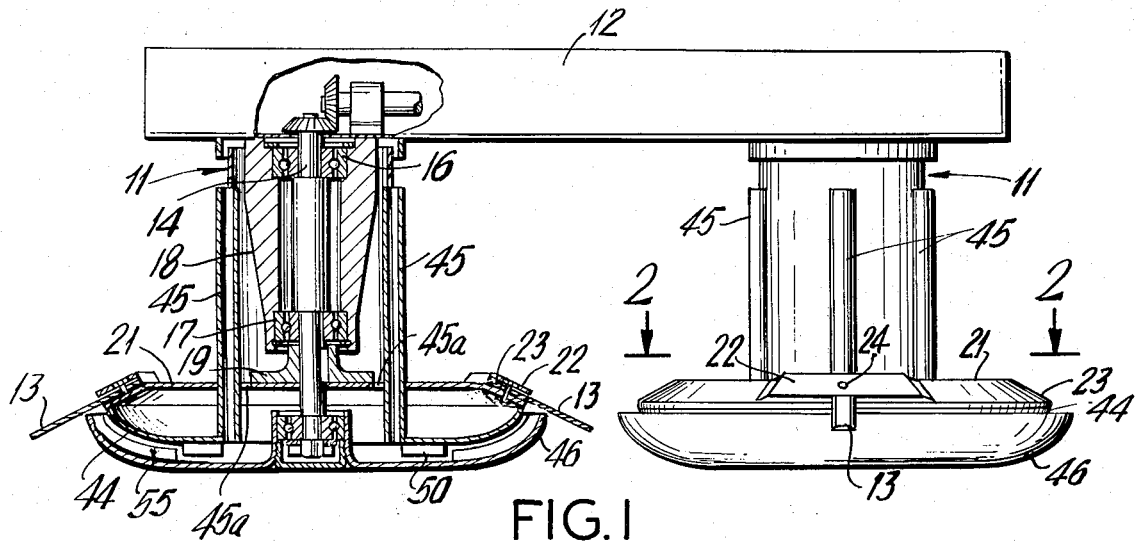
FIG. 1 is a side view of the mower comprising the invention with one of the cutting cylinders shown in cross section.
Figure 2:
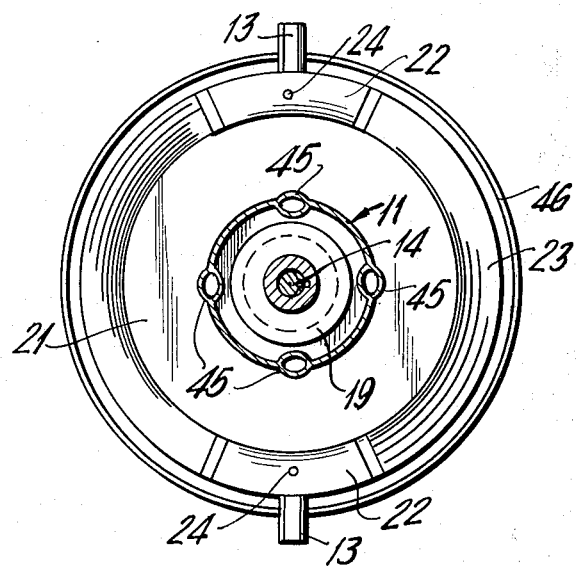
FIG. 2 comprises a top view taken along the line 2—2 of FIG. 1.

Referring now to FIG. 1 of the drawings, the invention relates to a new and improved rotary mower comprising one or more cutting cylinders 11 extending downwardly from gear drive means 12 and having a plurality of cutting blades or knives 13 associated therewith at the lower end thereof. In the cross-sectional cylinder on the left hand side of FIG. 1, it may be noted that the drive shaft 14 is journaled in bearings 16 at its upper end and in bearings 17 at an intermediate point. The shaft portion between bearings 16 and 17 is located within a housing 18 and is supported by element 19. Element 19 is mounted on the collar section 21 which is level or gently inclined downward in the area adjacent to the cylinder portion 11 and level or beveled downward at 23 for a predetermined distance about the entire perimeter.

The collar section 21 and cylinder 11 are provided with air intake openings or ducts 45 and/or additional apertures 45a in the collar section 21 and at least one radially arranged vane 50. An integral convex protective bottom dome 44 and a sliding, freely rotational saucer 46 are mounted on the bottom of each cylinder assembly with at least one vertical lamination 55 in the saucer 46. This arrangement, as will be described later in greater detail, provides the necessary updraft for mowing in thin hay wherein a conventional mower would tend to direct the grass away from the cutting blades 13. The air stream on the inside of the cutting cylinders 11 also provides a desirable coolant for the mower's gears and bearings through apertures 45a.

Figure 3:
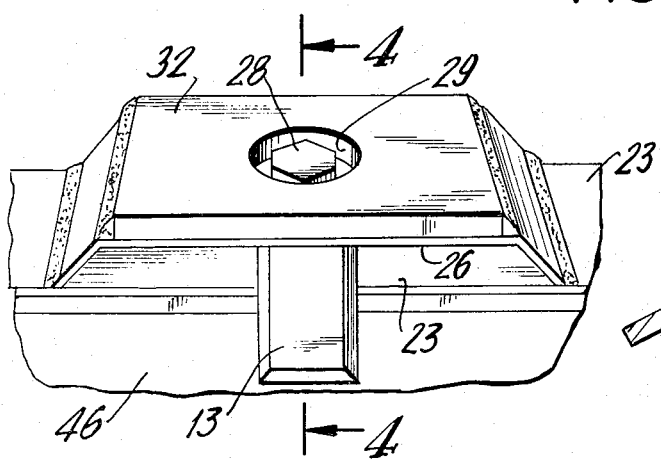
FIG. 3 is an enlarged view of the cutting blade shown in FIG. 1.
Figure 4:
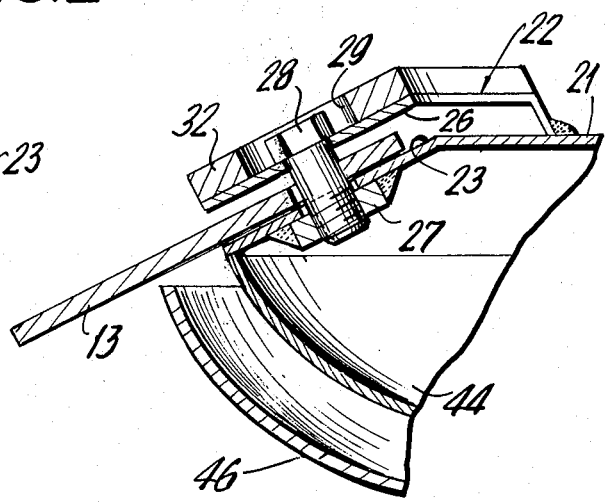
FIG. 4 is a cross-sectional view taken along the line 4—4 of FIG. 3.

In order to provide improved protection for the cutting knives 13, channel type elements 22 are welded at predetermined equally spaced intervals on top of the beveled rim 23. The depth of the channel element 22 is approximately equal to the depth of the beveled rim 23. The width of element 22 provides sufficient clearance for each free swinging blade 13 to a move in a full circle about pivot point 24 when it strikes a hard object. Similarly, the height of each channel or roof section 22 should be sufficient to permit enough clearance between the roof underside 26 and the beveled rim 23 (FIG. 3) so that each cutting knife can swing freely into the protective housing between the channel member of the roof 22 and the beveled rim 23 when colliding with a hard object.

The blade fastener may comprise a special nut 27 which is welded beneath the rim 23 at the center of each roof section 22 and cooperating bolt 28 which is positioned within a recess 29 and extends downwardly through the roof 22 to engage the nut 27. For added strength, the head of bolt 28 may be mounted as shown in a countersunk hole 29 of a heavy steel plate 32 which is fixed on top of each roof element 22.

Figure 5:
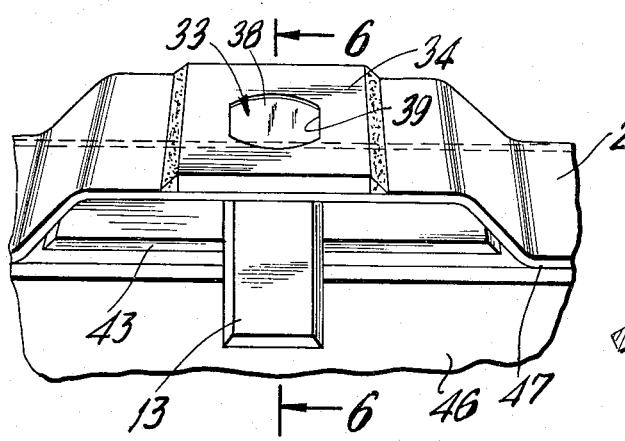
FIG. 5 discloses an alternate embodiment of the knife holder arrangement.
Figure 6:
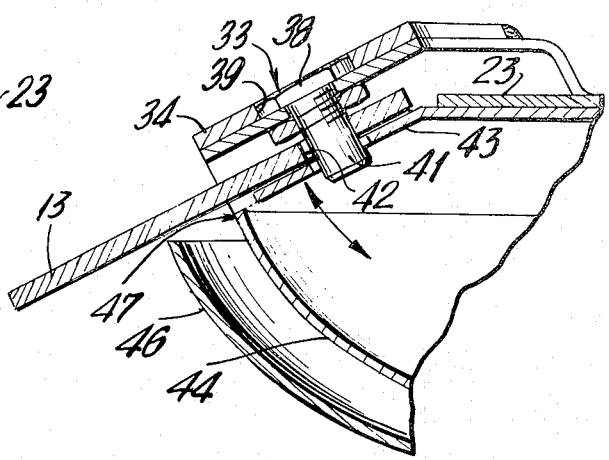
FIG. 6 shows a cross-sectional view taken along the line 6—6 of FIG. 5.

FIG. 5 discloses an alternate embodiment of the invention wherein the blade 13 is mounted by means of a bolt 33 to a raised portion 34 of the beveled rim 23. Each raised portion 34 is severed at its rear end from the collar section 21 at a predetermined distance from the pivot point 24 of each knife 13 to permit complete rotation of the knife. The bolt 33 is positioned with its head 38 in a countersunk hole 39 in the raised portion 34. The shank 41 of the bolt 33 extends through the pivot hole 42 of knife 13 and is held in position by a flat spring 43. Said spring 43 is shaped to match the tapered design of the bottom configuration of each raised portion 34 into which it is recessed or positioned flush with the underside of the collar section 21 and/or 23, thus serving as a firm bottom enclosure for each housing channel, and, at the same time giving better protection to the bolt shank 41 and to the spring 43 itself against stone damages than embodiments disclosed in the prior art, particularly Zweegers U.S. Pat. No. 3,391,522.

Figure 12:
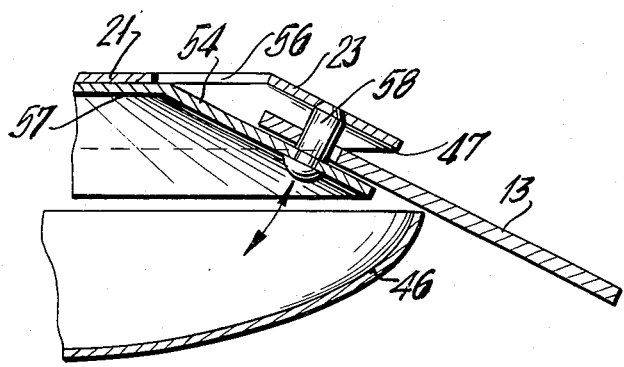
FIG. 12 is a cross-sectional view taken along the line 12—12 of FIG. 11.

The bolt 33 may be replaced with a pin similar to 58 in FIG. 12 and fixed to the flat spring 43 from which it extends upwardly through corresponding apertures in the knife 13 and the collar section rim similar to FIG. 12. The knives 13 may be readily installed and replaced in this embodiment by merely depressing the spring 43 downward.

The level or beveled collar section 23 may be open or enclosed at its bottom with a convex circular dome 44 which provides added protection for the knife fastener system. The dome 44 is similar in configuration to the mower saucer 46 which is mounted a short distance therefrom. The outside diameter of the dome 44 is approximately equal to the circular bottom edge 47 of the collar section perimeter. The dome 44 must be kept smaller in diameter than the saucer 46 if the desired updraft is to be generated through the ring gap between the peripheries of dome 44 and saucer 46.

Figure 14:
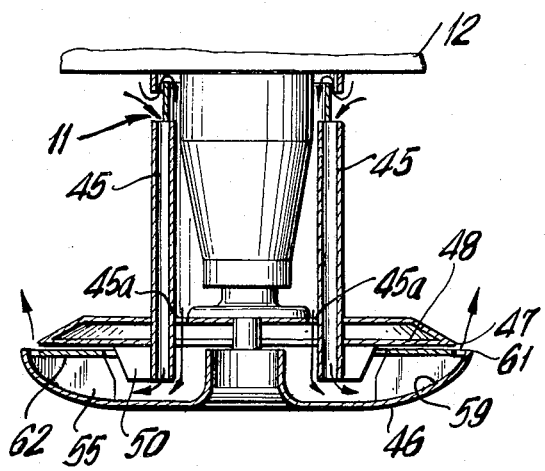
Figure 15:
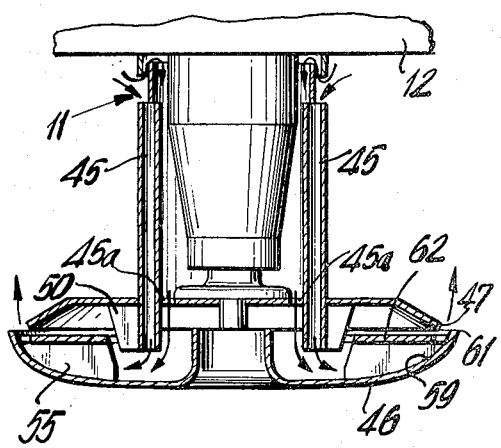

In some embodiments, the bottom dome 44 may be substituted with a flat element or disc 48 as shown in FIG. 14 with an outside diameter approximately equal to the collar section perimeter 47. The disc 48 can also be fitted flush with the circular bottom edge of the collar perimeter or it may be omitted entirely in other embodiments as shown in FIG. 15.

Figure 7:
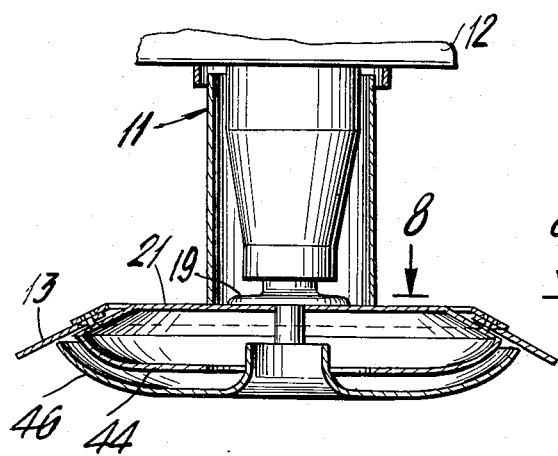
FIG. 7 discloses a further embodiment of the invention.
Figure 8:
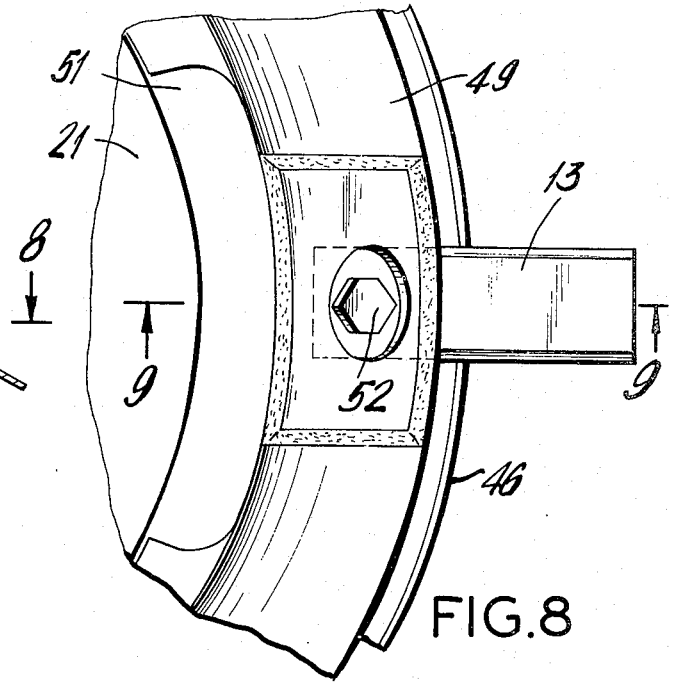
FIG. 8 is an enlarged view taken along the line 8—8 of FIG. 7.
Figure 9:
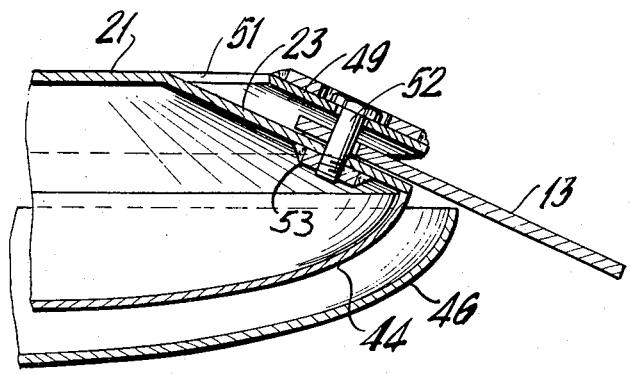
FIG. 9 is a cross-sectional view taken along the line 9—9 of FIG. 8.

In the embodiment of FIGS. 7–9, a continuous level or beveled collar ring 49 is mounted on top of the level or beveled collar section 23 and has the same angularity as said collar section 23. The design results in a continuous circular knife housing in which the level or beveled roof 49 and the associated collar section 23 are parellel to each other and at a sufficient distance to permit the knife to swing freely in the gap. In order to permit each knife to move in a full circle when colliding with a hard object, circular window sections 51 are cut out of the horizontal portion of the beveled collar ring 49 or instead, the beveled collar ring 49 may be sufficiently increased in depth. The beveled collar ring 49 may be welded to the beveled collar section 23 or bolted thereto with the bolts 52 and nuts 53 which also serve as knife fasteners or with suitable additional fasteners.

As the same operational effect, as that set forth above, is achieved with the sectional and continuous knife housings shown in FIGS. 3 through 9, all embodiments disclosed in this application no longer depend on any particular saucer size for protection against damage from stones or other hard objects and can be used in conjunction with saucer diameters equal to or smaller than that of the collar section.

On the other hand, a saucer with a diameter larger than that of the collar section would not require the knife fastening methods shown in FIGS. 3 through 12 and can therefore be safely used in conjunction with all knife securing methods and collar section designs disclosed in the prior art including Zneegers U.S. Pat. No. 3,391,522.

Figure 10:
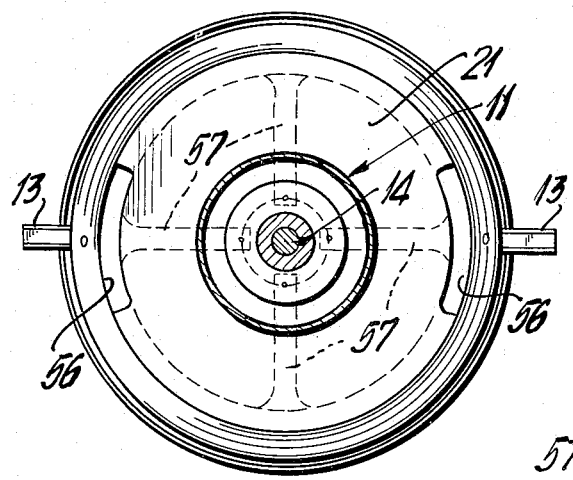
FIG. 10 is another embodiment of the invention.
Figure 11:
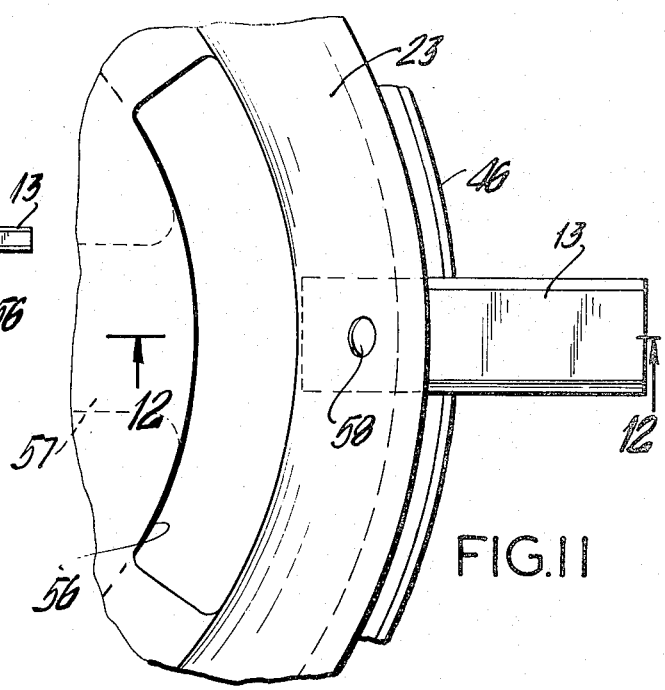
FIG. 11 is an enlarged view of the blade portion shown in FIG. 10.

In FIGS. 10–12, the knife and knife fastener protection is achieved by positioning a modified level or beveled collar ring 54 underneath the level or beveled collar section 23 (See FIG. 12) instead of on top of said section as in FIGS. 7–9. As a further difference, the circular window sections 56 are cut out of the horizontal portion 21 of the collar section rather than the horizontal portion of the ring 49 as in the previous embodiment. The beveled collar ring 54 is also made of spring steel and includes a plurality of radial prongs 57 extending inwardly from the ring 54 with the free ends of the prongs 57 fastened to the underside of the collar section 21. The prongs 57 are of a predetermined width and thickness sufficient to provide the necessary clamping pressure for each adjacent collar ring portion, which is equipped with a pivot pin 58. Its upper end may be designed to slidingly engage a register hole in the beveled collar section 23 above. Conversely, a pivot bolt similar to 33 in FIG. 6 may be fixed to the collar section 23 extending therefrom downwardly through corresponding apertures in the knife 13 and spring collar ring 54. With this design, a knife change can be readily made by merely depressing the beveled ring section 54 at a point close to the pivot point of the knife 13 with a suitable level device such as a larger size screw driver.

As a further feature, simple radial cuts (not shown) may be made through the collar ring 54 at a point between adjacent prongs 57 so that each knife carrying segment can be depressed individually for knife changes. This arrangement also reduces the force required for depressing each knife collar section while providing the same advantages as the integral design. Upwardly bent ears along the collar ring 54 or other suitable spacer elements may be used in order to assure a satisfactory alignment among the segments. It is also possible, after segmenting the ring 54, to omit the prongs 47 and fasten each segment at one end. This latter arrangement would more likely require additional spacer components (as mentioned above) to insure proper alignment of the segments to each other in their circular configuration. The additional advantage of the integral segmented circular spring design is that the same elements can be used on each cutting cylinder regardless of its sense of rotation. Placement of the cutter knives 13 into an open sectional or continuously circular housing above or underneath the collar section 21, also permits easier access to the knives and knife fasteners and removal of undesirable accumulations of hay choppings which tend to interfere with the knife's free-swinging action. In addition, by integrating the spring prongs 57 with the peripheral collar ring 54, the spring prongs 57 are now much better protected against dislocation when colliding with stones in contrast with those disclosed in the prior art, particularly Zweegers U.S. Pat. No. 3,391,522 and when used in conjunction with Zweegers' saucer sizes, which feature a smaller diameter than the collar section perimeter.

Another variation of the present invention involves increasing the inside and outside diameters of the collar ring 54 in FIGS. 10–12 to equal that of the collar ring 49 of FIGS. 7–9 and then mounting it on top of the beveled section 23 rather than underneath it. The knife fasteners would then be positioned at a safe distance from the collar ring prongs 57 in order to insure an unobstructed free-swinging knife motion about each knife pivoting point. Knife changes would now simply require that the enlarged collar ring 54 be lifted upward rather than depressed downwardly. Again, the spring collar 54 may be segmented and the prongs 57 omitted as described in connection with the bottom mounted version. The use of a circular integral or segmented spring collar placed whether on top or underneath the collar section 23 would permit the collar section to be left open at its bottom as shown in FIG. 15, as this knife fastening arrangement in itself offers sufficient protection against stones and other solid objects.

Since the present invention uses a downwardly beveled collar perimeter design and maintains a sufficiently narrow clearance between the peripheral beveled roof and bottom layers between which the knives 13 are mounted, the knives, upon breaking away from their fastening points will be safely directed downwardly into the ground at a rather short distance from the collar perimeter 47. Furthermore, the knife portion in cutting position extending outwardly from underneath the peripheral roof edge of its protective housing compared to the knife portion extending inwardly under the roof section may be varied to achieve the most effective ratio.

Also the depth of each sectional or continuous beveled peripheral knife housing shown in the drawings may be extended up to and butting against the rotor's cylinder portion 11, or to any point where the cutting portion of each knife 13 no longer emerges beyond the inward edge of said protective housing, when describing a full circle. Each knife housing may also be closed at the inward end at a distance from the pivot point of each knife either permitting its unobstructed move in a full circle or limiting its evasive swinging motion within a range of approximately 70° to 170° in either direction, thus preventing said knife from becoming lodged in a location approximately 180° opposed to its theoretical cutting position.

On the other hand, free access to each knife from the rear of each housing should preferably be provided for the purposes of easier cleaning, knife replacement and other maintenance requirements. Placement of the cutter knives 13 into an open sectional or continuous circular housing above or underneath the collar section 23 also permits easier access to the knives 13 and knife fasteners and the removal of undesirable accumulations or hay choppings which tend to interfere with the knives' free-swinging action.

Figure 13:
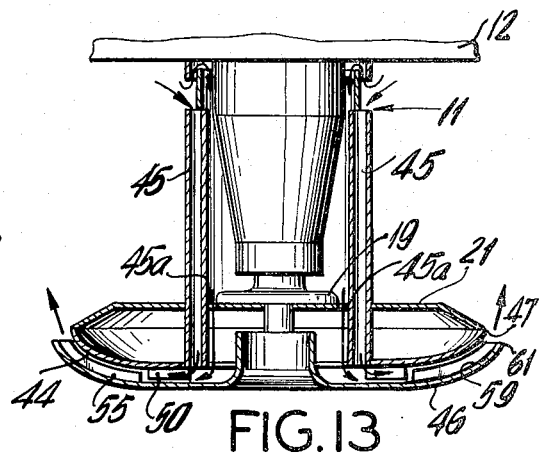
FIGS. 13–15 show various embodiments of the invention for providing an updraft to direct the material being cut into the path of the mower.

In FIGS. 13–14, the means for creating an updraft and directing the grass into the blades 13 is disclosed with the air path indicated by arrows. In order to generate the necessary updraft for mowing in thin hay, the collar sections 21 and/or cylinder portions 11 are provided with suitable air intake openings or ducts 45 respectively and/or additional apertures 45a in the collar section 21 on the inside of the cutting cylinder 11. The trailing edge of each aperture 45a may be pitched upwardly like a scoop and/or the leading edges pitched downward in order to simultaneously generate a suction effect and a downward air draft inside of each cutting cylinder 11. Either feature may eliminate the need for additional rotor vanes 50. For greater resiliency against stones, the ducts 45 may be made of steel or tough and flexible material which is easily replaceable. Furthermore, the underside of the collar section 21 is equipped with at least one radially arranged vane 50 and the saucer 46 underneath each cutting cylinder 11, with a suitable number of radially arranged vertical laminations 55, which are fitted to the bottom on the inside of each saucer 46 and extended from an area adjacent to the rotor vanes 50 to the saucer perimeter.

The height and configuration of the rotor vanes 50 and saucer laminations 55 are to be such that the rotating vanes 50 and stationary laminations 55 interact most effectively and efficiently in converting the rotational air flow generated by the collar vanes 50 first into a straight and radially directed air stream toward the saucer perimeter 61 and then, by the upward inside curvature 59 of the saucer perimeter 61 into a straight upward path with little or no air rotation.

In order to provide the necessary conditions for the straight and upward jet stream required for steadying thin hay prior to its being cut, and simultaneously assisting the cylinder generated horizontal air flow in raising downed hay, the diameter of the saucers 46 must be sufficiently larger than the diameter of the collar section perimeter 47 so that a circular gap, similar in cross section to a jet, is formed between the saucers' inside diameter and the collar's outside diameter for the air stream to escape at the proper velocity. Also, the rotor vanes 50 underneath elements 44, 48 or 21 must be placed low enough in relation to the saucer rim 61 in order to ensure that the rotor generated jet stream is first directed against the inside curvature 59 of the saucer rim for maximum upward deflection through the ring gap between saucer inside and collar outside diameters. The jet stream also avoids any dust and dirt accumulation inside the saucers 46.

For greater efficiency in converting the rotational air current generated by the rotor vanes 50 into a stationary upward flow, the saucer laminations 55 may be covered with a respectively plain or concave circular disc 62 with an inner diameter larger than the outside diameter of the rotor vanes 50 and an outside diameter approximately equal to the collar rim perimeter 47.

While the invention has been explained by a detailed description of certain specific embodiments, it is understood that various modifications and substitutions can be made in any of them within the scope of the appended claims which are intended also to include equivalents of such embodiments.

What is claimed is:

1. In a rotary mower, the combination comprising:
a mower body rotatable about a generally vertical axis; including a generally vertical cylinder in the center thereof,
a collar portion fixed to the bottom of said cylinder,
a plurality of protective housings located about the periphery of the collar portion and a cutting knife mounted in each housing, said knives being rotatable about their mounting upon striking an object and said mountings being protected on the upper and lower surfaces by the housings, and
a freely rotatable protective saucer mounted to the mower body at the lower end thereof at a predetermined distance from the collar portion.

2. A rotary mower in accordance with claim 1 wherein:
the mower body includes a lower collar portion having a beveled peripheral section, and,
the protective housings each comprise a channel type element mounted on the peripheral portion of the collar with a depth approximately equal to the beveled rim portion and having a roof portion spaced above said rim portion to provide clearance for the blade mounted therein so that said blade can move in a complete circle within said element.

3. A rotary mower in accordance with claim 2 wherein:
the mower further includes a bolt and a nut, wherein the nut is welded to the underside of the collar portion, and the blade and channel type elements include corresponding apertures which engage the bolt so that each blade is rotatably mounted within a channel type member.

4. A rotary mower in accordance with claim 1 wherein:
the mower further includes a rotatable protective member mounted on the bottom of said cylinder at a predetermined distance above the saucer.

5. A rotary mower in accordance with claim 2 wherein:
the protective housings are open at the interior end facing the cylinder to permit rotation of the blade in a full circle.

6. A rotary mower in accordance with claim 1 wherein:
the protective housings each comprise a channel type element mounted on the peripheral portion of the collar having means limiting the swinging action of the blade within a range of approximately 70° to 170° towards both sides to prevent the knife from becoming lodged in a position approximately 180° opposed to its theoretical cutting position.

7. A rotary mower in accordance with claim 6 wherein:
the channel type elements have a depth approximately equal to any portion of each knife's length.

8. A rotary mower in accordance with claim 1 wherein:
the collar portion includes a plurality of radially extending raised portions each forming a protective knife housing open at the end facing the cylinder to permit rotation of the knife in a full circle.

9. A rotary mower in accordance with claim 1 wherein:
the collar section includes a plurality of radially extending raised portions each forming a protective knife housing, the housings being closed at a distance from the pivot point of each knife to limit the swinging action of the knife within predetermined limits.

10. A rotary mower in accordance with claim 9 wherein:
the raised portion of each housing and each knife include a corresponding hole, and,
said mower further includes a bolt positioned within each of said holes with a shank portion extending downwardly therefrom and a spring member engaging the shank portion whereby said knife may be readily replaced by actuating said spring.

11. A rotary mower in accordance with claim 9 wherein:
the raised portion of each housing and each knife include a corresponding hole, and,
said mower further includes a bolt positioned within said holes with a shank portion extending downwardly therefrom and a spring member extending over the full width of the raised housing portion in such a manner that the underside of the spring and the underside of the collar portion are flush with each other to form a safely closed knife bearing channel.

12. A rotary mower in accordance with claim 1 wherein:
the mower further includes a continuous collar spring ring mounted on top of the periphery of the collar section at a predetermined distance therefrom to provide the protective housings for said knives and further including a plurality of bolts fixed to the collar section and extending upwardly through said collar and ring and wherein the knives each include an aperture engaged by one of the bolts.

13. A rotary mower in accordance with claim 12 wherein:
the collar includes a plurality of radial prongs extending inwardly from said ring with said prongs having free interior ends mounted to the collar section.

14. A rotary mower in accordance with claim 12 wherein:
said collar ring includes a plurality of radial prongs extending inwardly from the ring with radial cuts between adjacent prongs so that each knife carrying portion can be depressed individually for knife changes.

15. A rotary mower in accordance with claim 1 wherein:
the mower further includes a spring ring collar mounted underneath the periphery of the collar section at a predetermined distance therefrom to provide a housing for the knives.

16. A rotary mower in accordance with claim 4 wherein:
the protective saucer is in the form of a convex dome, and,
the protective bottom member is in the form of a convex dome similar in configuration to the saucer and having an outside diameter substantially equal to the perimeter of the collar section.

17. A rotary mower in accordance with claim 1 wherein:
the cylinder includes air intake ducts extending downwardly through the collar portion into the saucer area.

18. A rotary mower in accordance with claim 17 wherein:
the mower further includes at least one radially arranged vane mounted beneath the collar section,
at least one vertical lamination on the saucer, and, wherein
an updraft is provided for directing the material to be cut into the knife blades, for cooling the mower's gears and bearings and for removing dirt and dust in the saucers.

19. In a rotary mower, the combination comprising:
drive means for the mower,
a rotary portion coupled to the drive means and having a collar portion mounted thereto,
at least one protective housing located about the periphery of the collar portion and a cutting knife mounted in each housing, said knives being rotatable about their mounting upon striking an object and said mountings being protected on the upper and lower surfaces by the housings, and,
a non-rotatable protective saucer mounted to the mower body at the lower end thereof at a predetermined distance from the collar portion.

* * * * *